(12) United States Patent
Nieland et al.

(10) Patent No.: US 12,217,114 B2
(45) Date of Patent: Feb. 4, 2025

(54) LEAD-FRAME, CARD BODY OF A SMART CARD, SMART CARD, AND METHOD OF FORMING A SMART CARD

(71) Applicant: LINXENS HOLDING, Mantes la Jolie (FR)

(72) Inventors: Carsten Nieland, Dresden (DE); Lars Klemm, Dresden (DE); Sven Doering, Dresden (DE)

(73) Assignee: LINXENS HOLDING, Mantes la Jolie (FR)

( * ) Notice: Subject to any disclaimer, the term of this patent is extended or adjusted under 35 U.S.C. 154(b) by 0 days.

(21) Appl. No.: 18/287,989

(22) PCT Filed: Jul. 11, 2022

(86) PCT No.: PCT/EP2022/069230
§ 371 (c)(1),
(2) Date: Oct. 23, 2023

(87) PCT Pub. No.: WO2023/285337
PCT Pub. Date: Jan. 19, 2023

(65) Prior Publication Data
US 2024/0220760 A1    Jul. 4, 2024

(30) Foreign Application Priority Data
Jul. 15, 2021    (WO) .................. PCT/IB2021/000502

(51) Int. Cl.
*G06K 19/077*    (2006.01)
(52) U.S. Cl.
CPC .............................. *G06K 19/07722* (2013.01)
(58) Field of Classification Search
None
See application file for complete search history.

(56) References Cited

U.S. PATENT DOCUMENTS

| | | | | |
|---|---|---|---|---|
| 5,057,460 A | * | 10/1991 | Rose | ................... H01L 23/3121 |
| | | | | 257/679 |
| 6,617,672 B1 | * | 9/2003 | Dossetto | .......... G06K 19/07743 |
| | | | | 257/679 |
| 2014/0152511 A1 | | 6/2014 | Merlin et al. | |

FOREIGN PATENT DOCUMENTS

WO    2023285337 A1    1/2023

OTHER PUBLICATIONS

International Search Report and Written Opinion for related International Application No. PCT/EP2022/069230, dated Nov. 7, 2022, 12 pages.

* cited by examiner

*Primary Examiner* — Kristy A Haupt
(74) *Attorney, Agent, or Firm* — DITTHAVONG, STEINER & MLOTKOWSKI

(57) ABSTRACT

In various aspects, the present invention relates to a lead frame for integration into a smart card, a card body of a smart card, a smart card, and a method of forming a smart card. In an aspect of the present disclosure, a lead-frame for integration into a smart card is provided comprising a planar lead-frame body portion, at least one contact pad having a planar contact portion, and at least one bridging portion coupled with the planar lead-frame body portion and extending away from the planar lead-frame body towards the at least one contact pad and between the planar contact portion and the planar lead-frame portion, wherein the at least one bridging portion extending out of a plane defined by at least one of the planar lead-frame body portion and the planar contact portion and at least partially in parallel to a substantially normal direction of the planar contact portion.

19 Claims, 4 Drawing Sheets

Figure 1:
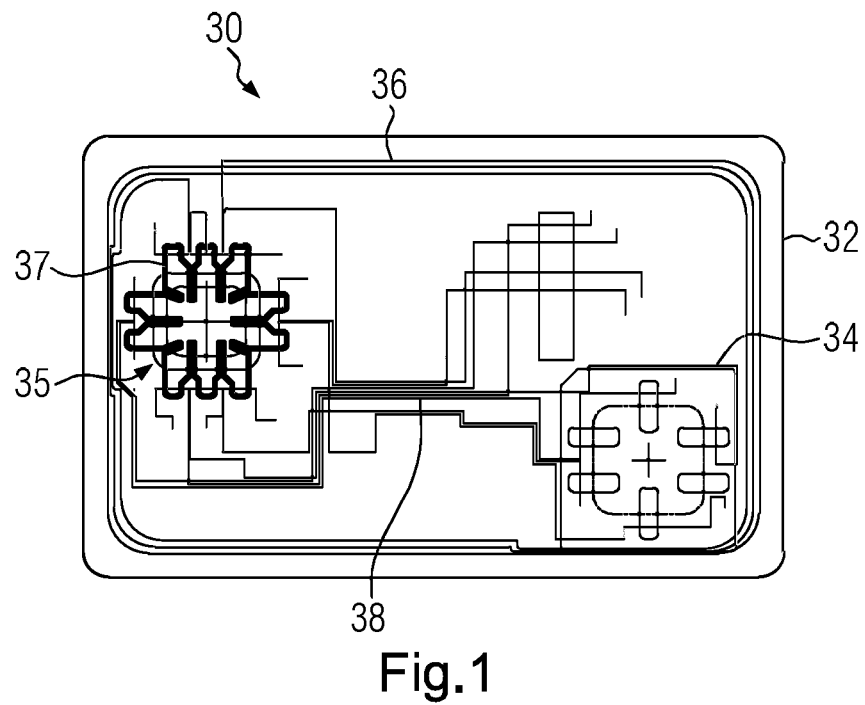

LEAD-FRAME, CARD BODY OF A SMART CARD, SMART CARD, AND METHOD OF FORMING A SMART CARD

RELATED APPLICATION

This U.S. National Phase application claims priority to International Application No. PCT/EP2022/069230, "Lead-Frame, Card Body of a Smart Card, Smart Card, and Method of Forming a Smart Card," filed Jul. 11, 2022, the entire contents of which is hereby incorporated by reference.

FIELD OF THE INVENTION

The present invention relates to a lead frame for integration into a smart card, a card body of a smart card, a smart card with such a card body, and a method of forming a smart card.

STATE OF THE ART

Smart cards have an increasing number of functions integrated therein. The functions are realized by a number of different modules and/or inlays which are integrated into a smart card during its fabrication process. Some functions of an advanced smart card may be implemented by a fingerprint sensor or other biometric sensors integrated into the smart card. For example, modern smart cards may include an antenna module or inlay to enable a wireless communication between the smart card and an external device. Furthermore, a smart card may have a chip module integrated therein for at least one of storing information and controlling other modules in the smart card.

With an increasing number of electric and electronic modules to be integrated into a card body of a smart card, interconnection structures are used for interconnecting different modules with each other, such as a chip module with an antenna module and the like. A lead-frame is an example of such an interconnection structure, basically representing a metal structure inside a card body for carrying signals from one module to another module.

Document WO 2020/204831 A1 shows a biometric card with two lead-frames integrated therein. The integration of the lead-frames is achieved by laminating the lead-frames at desired locations within a card body and forming openings in the card body for exposing contact portions of the lead-frames. These contact portions of the lead-frames are then electrically coupled with internal contacts of the card body and a dedicated milling process is employed for detaching the contact portions from each other.

Conventional processes for providing interconnections via lead-frames usually require more than one milling process, each of which needs to be performed within the technical tolerances and thereby adding to complexity in the fabrication of smart cards. Furthermore, when refilling openings in the card body, material of the card body is consumed such that refilled openings (i.e., the opening which subjected to refilling) are not completely refilled but form small indention(s) in the card-body surface at the location of the refilled openings. Accordingly formed indentions may impair the aesthetic appearance of a smart card, but also represent structural weak points of the card body, bearing the risk of impairing the integrity of a smart card.

In view of the above described situation t is an object of the present invention to overcome the drawbacks of the prior art and to provide an improved lead-frame for integration into a smart card, an improved card body of a smart card and an improved method of forming a smart card.

BRIEF SUMMARY

In a first aspect of the present disclosure, a lead-frame for integration into a smart card is provided. In accordance with some illustrative embodiments of the first aspect, the lead-frame comprises a planar lead-frame body portion, at least one contact pad having a planar contact portion, and at least one bridging portion coupled with the planar lead-frame body portion and extending away from the planar lead-frame body towards the at least one contact pad and between the planar contact portion and the planar lead-frame portion, wherein the at least one bridging portion extends out of a plane defined by at least one of the planar lead-frame body portion and the planar contact portion and at least partially in parallel to a substantially normal direction of the planar contact portion. The bridging portion of the at least one bridging portion extending out of the plane defined by at least one of the planar lead-frame body portion and the planar contact portion, thereby realizing a three dimensional lead-frame shape, i.e., a lead-frame that is not extending totally within one plane. This three dimensional lead-frame shape allows to either locate the at least one planar contact portion in a different height level relative to another contact pad and/or the planar lead-frame body portion. Accordingly, the issue of indentions when integrating this lead-frame into a card body of a smart and/or a number of openings to be formed within a card body, may be avoided. The at least one bridging portion may represent a temporary connection between the planar lead-frame body portion at the at least one contact pad of the lead-frame, which may be easily removed with an appropriate opening in a card body of a smart card during the fabrication of the smart card without the risk of damaging contact pads of the lead-frame when forming the opening, e.g., by milling the opening. In some illustrative examples herein, the lead-frame may be a cup shaped lead frame.

Furthermore, a compact lead-frame of a three dimensional shape is realized in the first aspect. In an advantageous example, the planar lead-frame body portion may be a bottom face portion of a cup shaped structure portion of the lead-frame, while a sidewall portion of the cup shaped structure portion may be provided by at least one bridging portion which could also be considered as a cylindrical lead-frame body portion. In this way, the planar lead-frame body portion may be coupled with the cylindrical lead-frame body portion extending away from the planar lead-frame body portion towards the at least one contact pad. Such a cup shaped lead-frame body portion configuration may allow for a reinforcement and/or shielding function when integrating such a lead-frame into a smart card.

In a first illustrative embodiment of the first aspect, the planar lead-frame body portion and the planar contact portion may be arranged in parallel at two different height levels relative to each other. This may allow to detach the at least one contact pad from the planar lead-frame body portion due to the different height levels when integrating such a lead-frame into a body of a smart card.

In a second illustrative embodiment of the first aspect, the at least one bridging portion may extend beyond the other one of the planar contact portion and the planar lead-frame body portion. With an accordingly configured bridging portion, it is possible to electrically detach the planar lead-frame body portion from the at least one contact pad by removing the at least one bridging portion without removing the planar lead-frame body portion and/or affecting the at least one contact pad. It is therefore possible to use a remaining planar lead-frame body portion after the detaching as a reinforcement structure in a smart card into which the lead-frame is integrated.

In a third illustrative embodiment of the first aspect, the planar lead-frame body portion may be of a substantially ring shape. In an advantageous illustrative example herein, the planar lead-frame body portion may at least partially encircle the at least one contact pad. Such a ring-shaped planar lead-frame body portion may represent a structural enforcement of the lead-frame and subsequently, upon integration into a smart card, of a smart card. A degree of reinforcement may be increased with a degree of encircling of the at least one contact pad.

In a fourth illustrative embodiment of the first aspect, the lead-frame may have a plurality of contact pads, wherein at least a subset of the plurality of contact pads is arranged coplanar with the planar lead-frame body portion. Accordingly, the lead-frame may allow an interconnection at different depth levels in a smart card.

In a fifth illustrative embodiment of the first aspect, the at least one contact pad may have a holding portion with at least one recess formed therein. Such a holding portion may provide for an improved embedding of the lead-frame into the card body of a smart card.

In an illustrative example of the fifth illustrative embodiment, the at least one recess may be formed as a through hole extending through a thickness of the at least one contact pad in the holding portion. This allows an improved bonding of the lead-frame to the card body.

In another illustrative example of the fifth illustrative embodiment, the holding portion and at least one of the planar lead-frame body portion and the planar contact portion may be arranged in parallel at two different height levels relative to each other. Such a configuration allows for an improved mechanical joining of the lead-frame to a card body.

In a second aspect of the present disclosure, a prelam body for a smart card is provided. In illustrative embodiments herein, such a prelam body comprises at least one lead-frame according to the first aspect, thereby showing an improved mechanical and electrical interconnection without being impaired in its aesthetic by indentions.

In the present disclosure, the expression "prelam body", as used herein, is understood as representing a prelaminated body with multiple layers of an insulating material, such as PVC, PC or some other appropriate thermoplastic polymer, which multiple layers are pre-laminated together. Such a prelaminated body may be considered as representing an intermediate product obtained during fabrication of a smart card. For example, an illustrative prelam body may be obtained by fusing together different layers of a thermoplastic material into a single homogeneous sheet body, thereby forming a monolithic substrate body. In some illustrative examples of a prelam body, the substrate body (or base substrate) may have at least one contact and/or interconnection embedded therein, optionally with one or more electronic modules integrated into the substrate body in electric connection with at least one contact and/or interconnection of the substrate body.

In a first illustrative embodiment of the second aspect, the at least one bridging portion of the at least one lead-frame may be at least partially removed such that the planar lead-frame body portion of the at least one lead-frame and the planar contact portion of the at least one lead-frame are electrically disconnected. Accordingly, the planar lead-frame body portion may remain as a structural reinforcement in the prelam body.

In a second illustrative embodiment according to an alternative to the first embodiment, the prelam body may further comprise an opening formed within the prelam body so as to at least partially expose the planar contact portion of the at least one lead-frame and may at least partially remove the at least one bridging portion of the at least one lead-frame such that the planar lead-frame body portion of the at least one lead-frame and the planar contact portion of the at least one lead-frame are electrically disconnected. Such a prelam body may represent a prelam body as obtained during an intermediate fabrication stage where a module is to be integrated into the prelam body via the opening.

In an illustrative example herein, the opening may have a depth reaching to a depth level coplanar with a thickness level of about 10% to about 90%, preferably 30% to about 70%, of the at least one lead-frame within the prelam body. This may represent an advantageous opening, which at least reduces effects impairing an aesthetic appearance of the card body.

In some special illustrative embodiments of the second aspect, a smart card may be provided, the smart card being formed from the prelam body of the second aspect. Accordingly, advantages of the second aspect may be applied to a smart card.

In a third aspect of the present disclosure, a card body of a smart card is provided. In illustrative embodiments herein, the card body comprises at least one lead-frame according to the first aspect. Such a card body shows an improved mechanical and electrical interconnection and is not impaired in its aesthetic by indentions.

In a first illustrative embodiment of the third aspect, the at least one bridging portion of the at least one lead-frame may be at least partially removed such that the planar lead-frame body portion of the at least one lead-frame and the planar contact portion of the at least one lead-frame are electrically disconnected. Accordingly, the planar lead-frame body portion may remain as a structural reinforcement in the card body.

In a second illustrative embodiment according to an alternative to the first embodiment, the card body may further comprise an opening formed within the card body so as to at least partially expose the planar contact portion of the at least one lead-frame and may at least partially remove the at least one bridging portion of the at least one lead-frame such that the planar lead-frame body portion of the at least one lead-frame and the planar contact portion of the at least one lead-frame are electrically disconnected. Such a card body may represent a card body as obtained during an intermediate fabrication stage where a module is to be integrated into the card body via the opening.

In an illustrative example herein, the opening may have a depth reaching to a depth level coplanar with a thickness level of about 10% to about 90%, preferably 30% to about 70%, of the at least one lead-frame within the card body. This may represent an advantageous opening, which at least reduces effects impairing an aesthetic appearance of the card body.

In some special illustrative embodiments of the third aspect, a smart card may be provided, the smart being formed from the card body of the third aspect. Accordingly, advantages of the third aspect may be applied to a smart card.

In a fourth aspect of the present disclosure, a method of forming a smart card is provided. In illustrative embodiments of the third aspect, the method comprises providing the lead-frame of the first aspect, preparing a laminated card body having the lead-frame integrated therein, preferably the prelam body of the second aspect or the card body of the third aspect, and forming an opening in the laminated card body for at least partially exposing at least one contact pad of the lead-frame. Optionally, the method may further comprise exposing the laminated card body to a thermal treatment for at least partially filling the opening. Such a method is advantageous because it is enough to only form the opening in the laminate card body without the need for another opening.

In a first illustrative embodiment of the fourth aspect, the planar lead-frame body portion may be at least partially removed by the opening. Accordingly, detaching and/or disconnecting of the planar lead-frame body portion is achieved by the cavity.

In a second illustrative embodiment of the fourth aspect, the lead-frame is fabricated by etching or cutting or punching a flat lead-frame element out of a sheet or strip or band of material and, optionally, deep-drawing one of the sheet or strip or band of material and the flat lead-frame element, optionally including a bending of the flat lead-frame element and/or composing the lead-frame element from a plurality of lead-frame parts. This is an advantageous fabrication of a lead-frame which may be employed in mass production at low cost and high degree of repeatability.

In an example of the second illustrative embodiment, in combination with the lead-frame of the sixth illustrative embodiment of the first aspect, the method may further comprise forming the at least one recess in the holding portion prior to the etching or cutting or punching. Accordingly, a lead-frame with an improved mechanical joining of the lead-frame to the laminated card body is provided.

In a third illustrative embodiment of the fourth aspect, the lead-frame may be fabricated by one of sintering, molding, casting, and 3D printing. This may represent an easy method of providing the lead-frame.

In accordance with some illustrative embodiments, a module may be inserted in the opening and it may be attached by gluing.

Further illustrative embodiments and advantageous of the various aspects of the present disclosure will become apparent from the detailed description of some illustrative embodiments below.

FIG. 1 schematically shows a smart card with a lead-frame and some illustrative modules integrated into the smart card in accordance with some illustrative embodiments of the present disclosure.

Figure 2:
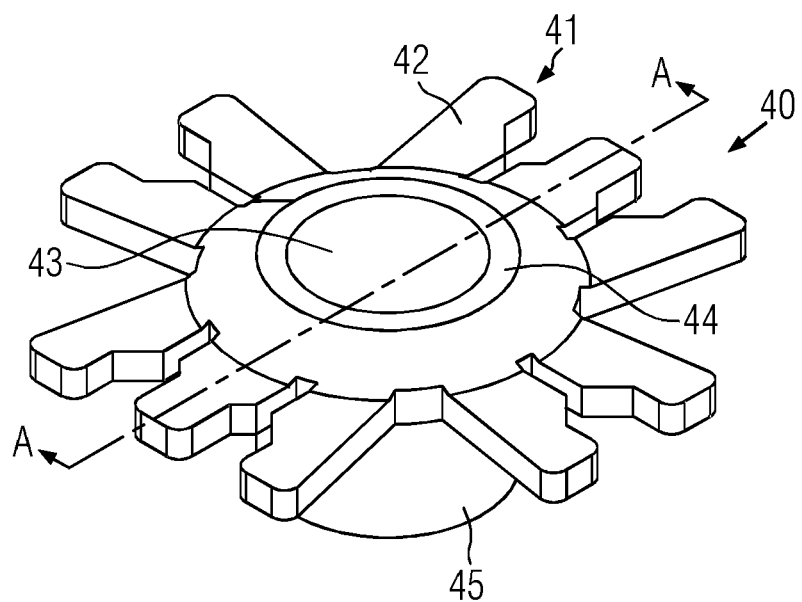

FIG. 2 schematically shows, in a perspective view, a lead-frame in accordance with some other illustrative embodiments of the present disclosure.

Figure 3A:
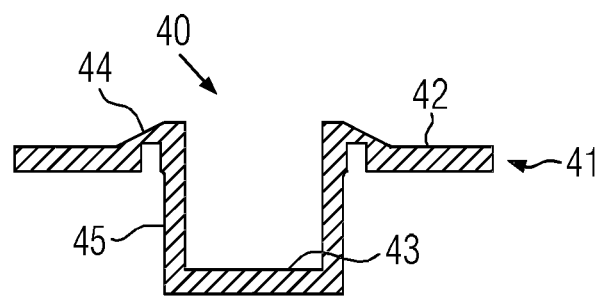

FIG. 3a schematically shows a cross sectional view of the lead frame of FIG. 2 along line A-A in FIG. 2 prior to an integration into the card body of a smart card.

Figure 3B:
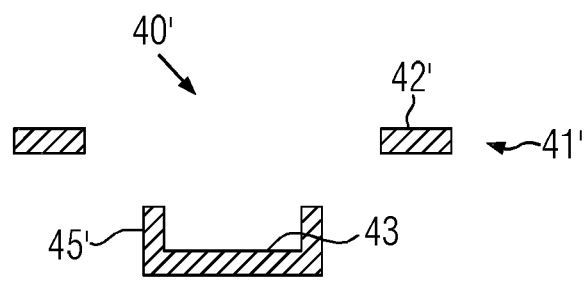

FIG. 3b schematically shows, in a cross sectional view corresponding to the cross sectional view of FIG. 3a, the lead-frame after integration of the lead-frame into a smart card and exposing the lead-frame to a detaching of contact pads.

Figure 4A:
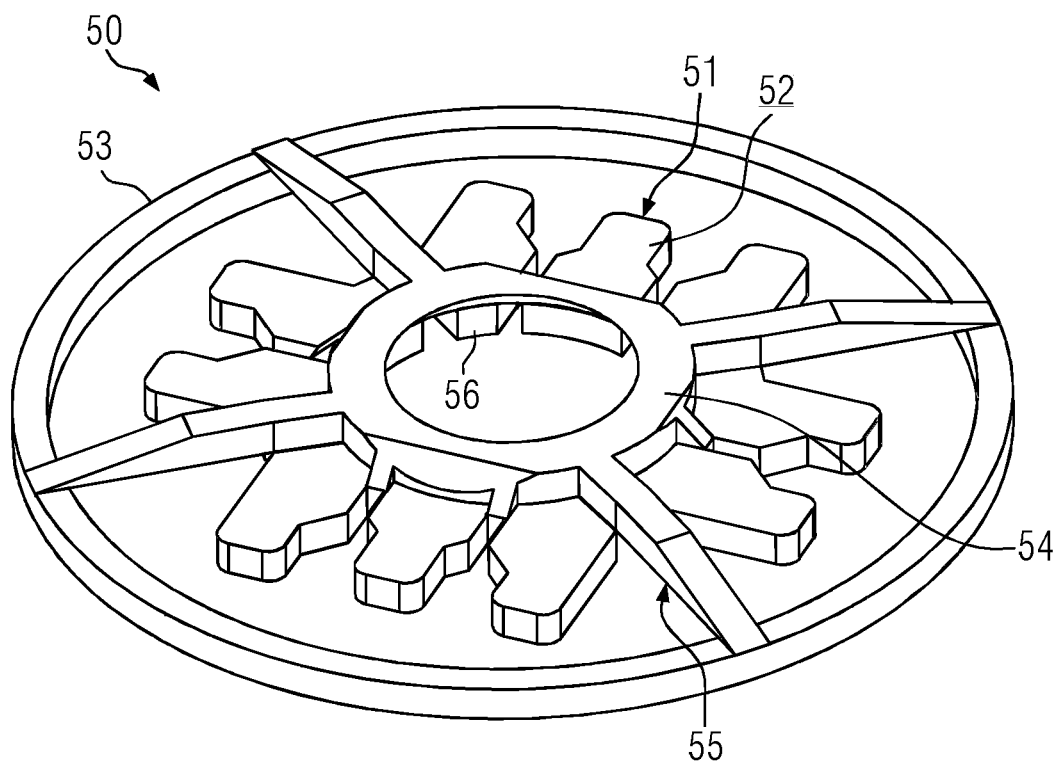

FIG. 4a schematically shows, in a perspective view, a lead-frame in accordance with some illustrative embodiments of the present disclosure.

Figure 4B:
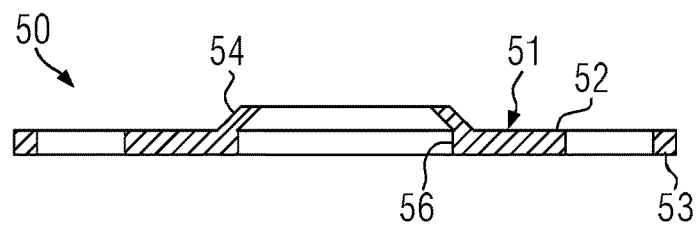

FIG. 4b schematically shows, in a cross sectional view along line A-A in FIG. 4a the lead-frame prior to an integration into a card body of a smart card.

Figure 5:
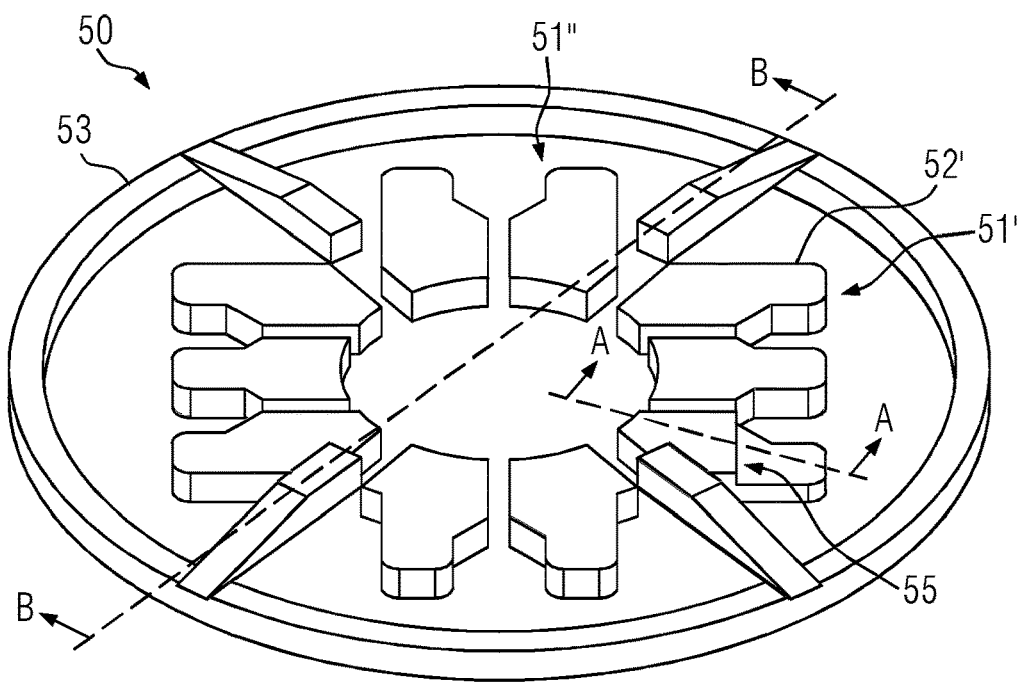

FIG. 5 schematically shows, the lead-frame of FIG. 4a in a perspective view after being subjected to a detaching process.

Figure 6A:
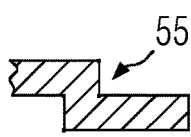

FIG. 6a schematically shows a cross sectional view along line A-A in FIG. 5.

Figure 6B:
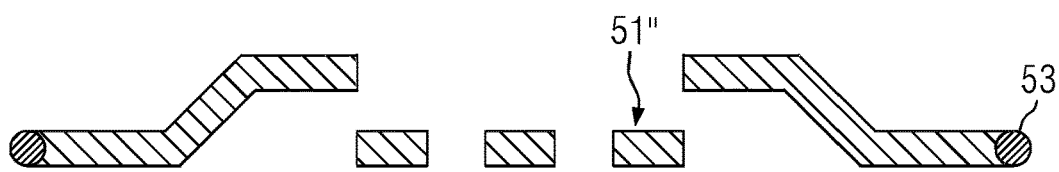

FIG. 6b schematically shows a cross sectional view along line B-B in FIG. 5.

Figure 7:
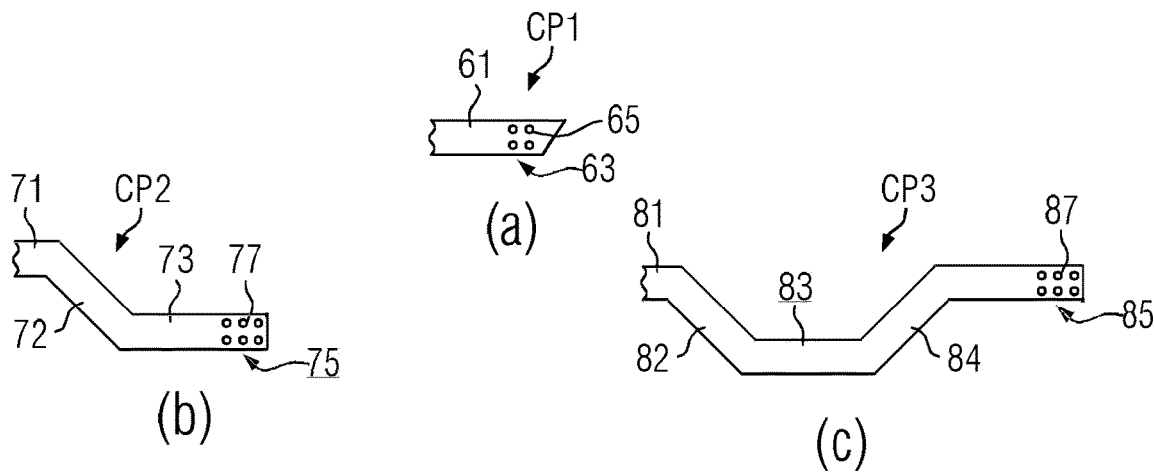

FIG. 7 shows according to its drawings (a), (b), and (c) a contact pad in a schematic perspective view according to different illustrative embodiments.

Figure 8:
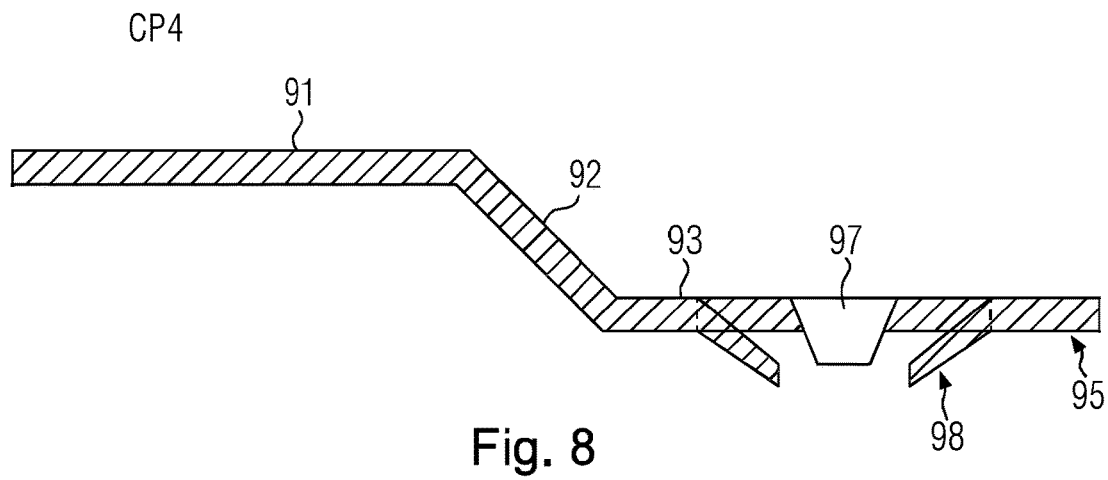

FIG. 8 schematically shows in a sectional side view a contact pad according to another illustrative embodiment.

Figure 9:
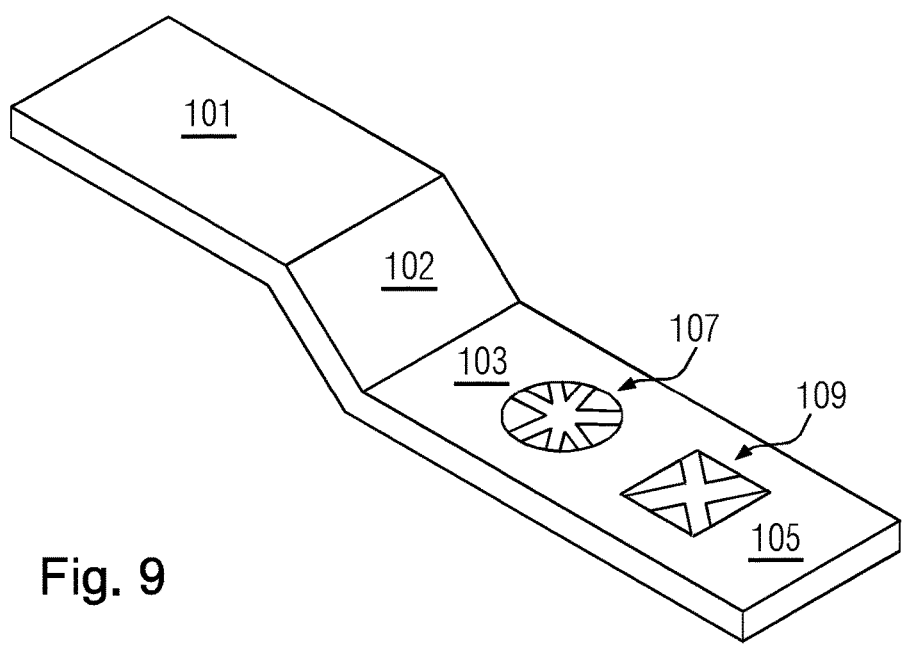

FIG. 9 schematically shows a contact pad in a schematic perspective view according to another illustrative embodiment.

Referring to FIG. 1, a smart card 30 in accordance with some illustrative embodiments of the present disclosure is schematically shown. In the illustration of FIG. 1, components integrated into a card body 32 of the smart card 30 are made visible although these components are embedded into the card body 32. By way of the exemplary illustration in FIG. 1, an antenna inlay 36 and a sensor module 34 is embedded into the card body 32. Furthermore, interconnection leads 38 for interconnecting the sensor module 34 with a lead-frame 35 are provided within the card body 32. Connection terminals of the antenna inlay 36 are electrically connected with contact pads 37 of the lead-frame 35. Furthermore, interconnection leads 38 are connected to contact pads of lead-frame 35, therefore enabling a communication between the sensor module 34 and the antenna inlay 36. Illustrative embodiments of the lead-frame 35 will be described below in greater detail.

Referring to FIG. 2, a cup-shaped lead-frame 40 for integration into a smart card (not illustrated) is schematically illustrated in a perspective view. FIG. 3a shows a cross sectional view of the lead-frame 40 of FIG. 2 along the line A-A in FIG. 2.

FIGS. 2 and 3a show the lead-frame 40 comprising a planar lead-frame body portion 43, a contact pad 41 having a planar contact portion 42 and at least one bridging portion extending between the contact pad 41 and the planar contact portion 43 for electrically and mechanically connecting the planar contact portion 43 and the contact pad 41. The person skilled in the art will appreciate that the number of contact pads may be an arbitrary number of contact pads such as one, two, three, four or more. Therefore, the illustration in FIG. 2 showing a plurality of ten contact pads is not limiting and any number of contact pads is possible. In particular, it is also possible to only provide a single contact pad 41 (not illustrated in FIG. 2).

With continued reference to FIGS. 2 and 3a, the at least one bridging portion extending between the planar lead-frame portion 43 and the contact pad 41 is given in the explicit illustration of FIG. 3a by means of a bridging portion 44 and a bridging portion 45 extending out of a plane defined by either one of the planar lead-frame body portion 43 and the planar contact portion 42 of the contact pad 41. That is, bridging portions of the embodiments as illustrated in FIG. 3a extending away from the contact pad 41 and at least partially extending in parallel to a substantially normal direction of the planar contact portion 42 may comprise a portion of the contact pad 41 extending between the planar contact portion 42 of the contact pad 41 and the bridging portion 42, the bridging portion 42, as well as the bridging portion 45. However, this is not limiting to the present disclosure and the bridging portion 44 and/or a portion of the contact pade 41 extending towards and directly contacting the bridging portion 45 may be optional.

Referring to the non-limiting illustration in FIG. 2, the bridging portion 44 may be of an annular ring shape with a chamfered side wall, while the bridging portion 44 is a hollow cylindrical portion which substantially extends along a substantial normal direction with respect to the planar lead-frame body portion 43. This does not pose any limitation on the present disclosure and the person skilled in the art will appreciate that any of the bridging portions 44 and 45 may be formed in a sectional shape, which only corresponds to a segment of a ring. For example, the planar lead-frame body portion may be mechanically connected with the bridging portion 44 even by an annular ring shape, by means of a plurality of bridging portions instead of the single bridging portion 45. For example, a plurality of bridging portions 45, each of which being coupled with one or more contact pads 41 may be provided between the planar lead-frame body portion 43, e.g., in form of one or more lead-frame fingers of a finger-shape, such one or more lead-frame fingers extending between the planar lead-frame body portion 43 and the planar contact portion 42 for electrically and mechanically connecting the planar contact portion 42 with the planar lead-frame body portion 43. For example, the one or more lead-frame fingers may be portions integral with and projecting away from the planar lead frame body portion 43 towards one or more contact pads 41 or portions integral with and projecting away from one or more contact pads 41 towards the planar lead frame body portion 43. Additionally, or alternatively, a plurality of bridging portions may be provided instead of the single bridging portion 44.

With continued reference to FIGS. 2 and 3a, the bridging portion 45 may extend beyond the planar contact portion 42 that is a length of the bridging portion 45 may be greater than a separation in height levels between the planar lead-frame body portion 43 and the planar contact portion 42.

With continued reference to FIG. 2, the contact pads 41 may be provided within a single plane as defined by the planar contact portion 42. This does not pose any limitation on the present disclosure and instead at least one of the contact pads may be located out of plane with regard to a plane defined by the planar contact portion 42.

By means of FIGS. 3a and 3b, different configurations of the lead-frame 40 corresponding to different stages during the fabrication of a smart card (not illustrated) are schematically illustrated in a cross sectional view. Herein, the cross sectional view of FIG. 3b is to be understood as corresponding to the cross sectional view of FIG. 3a, only relating to a different stage during fabrication.

During the fabrication of a smart card (not illustrated), the lead-frame 40 is provided and integrated into a card body (not illustrated) of a smart card (not illustrated). For example, the lead-frame 40 may be provided within the card body 32 of the smart card 30 in FIG. 1 in addition to or instead of the lead-frame 35 in FIG. 1. Accordingly, the lead-frame 40, shown in FIG. 3a, represents the lead-frame during a stage when being integrated into the smart card (not illustrated) and prior to any detaching of one or more contact pads within the smart card from the remaining lead-frame 40.

Referring to FIG. 3b, a lead-frame 40' is illustrated as representing the lead-frame 40 subjected to a detaching, i.e. an opening or cavity being provided in the smart card (not illustrated) for achieving a detaching of one or more contact pads. In the specific illustration of FIG. 3b, two contact pads, one being indicated by reference numeral 41' for the sake of illustration, is mechanically and electrically detached form the planar lead-frame body portion 43 by at least partially removing the bridging portion 44, the bridging portion 45 and another portion of the at least one bridging portion. In particular, as shown in FIG. 3b, the bridging portion 44 may be completely removed, possibly with an at least partial removal of the bridging portion 45 of the lead-frame 40, resulting in the remaining bridging portion 45'. However, this does not pose any limitation on the present disclosure and instead, the bridging portion 45' may be completely removed.

With regard to FIGS. 4a and 4b, a lead-frame 50, in accordance with some other illustrative embodiments of the present disclosure, will be described. Herein, FIG. 4a schematically shows the lead-frame 50 in a perspective view, while FIG. 4b schematically shows a cross sectional view of the lead-frame 50 along the line A-A in FIG. 4a.

With continued reference to FIGS. 4a and 4b, the lead-frame 50, for integration into a smart card (not illustrated), comprises a planar lead-frame body portion 53, at least one contact pad 51 having a planar contact portion 52, and at least one bridging portion extending between the planar lead-frame body portion 53 and the planar contact portion 52 for electrically/mechanically connecting the planar contact portion 52 with the planar lead-frame body portion 53, wherein the at least one bridging portion extends at least partially in parallel to a substantially normal direction of the planar contact portion 52. In the illustration of FIGS. 4a and 4b, the at least one bridging portion is provided by at least one bridging portion 55 which extends out of a plane defined by the planar lead-frame body portion 53 and the planar contact portion 52. According to the illustration in FIGS. 4a and 4b, the planar lead-frame body portion 53 and the planar contact portion 52 are arranged at the same height level relative to each other, i.e. both are arranged within the same plane. This does not pose any limitation on the present disclosure and at least one contact pad may have a planar contact portion (not illustrated) which is located at a different height level relative to the planar lead-frame body portion 53. Alternatively, the planar lead-frame body portion 53, may be located out of plane with regard to the plurality of contact pads.

Referring to FIG. 4b, the bridging portion (55 in FIG. 4a) may be coupled to a bridging portion 54 which has an annular ring shape and extends out of plane with regard to the planar contact portion 52. In particular, the bridging portion 55 is coupled to the planar contact portion 52 of the contact pad 51 via the ring shaped bridging portion 54 and a portion of the bridging portion 55 extending between the bridging portion 54 and the planar contact portion 52. An optionally remaining part of the bridging portion 55 extending between the planar contact portion 52 of the contact pad 51 and the ring shaped bridging portion 54 is not in mechanical and electrical contact with an adjacent contact pad and its respective bridging portion 55. That is, adjacent contact pads are only mechanically and electrically connected by the ring shaped bridging portion 54. In other words, upon removing the ring shaped bridging portion 54, a mechanical and electrical connection between adjacent contact pads is removed. However, as a mechanical and electrical connection between a part of the bridging portion 55 and one or more neighboring contact pads may be present, a removal of the bridging portion 55, at least in a region of the contact pads may ensure that adjacent contact pads are mechanically and electrically detached completely. This will be explained with regard to FIG. 5 below.

With continued reference to FIGS. 4a and 4b, the person skilled in the art will appreciate that the ring shaped bridging portion 54 and the ring shaped planar contact portion 53 may be concentrically arranged with regard to each other. In this configuration, the contact pads may be radially extending in the space between the ring shaped bridging portion 54 and the planar lead-frame body portion 53. Similarly, the bridging portion 55 radially extend between the bridging portion 54 and the planar lead-frame body portion 53.

In accordance with some illustrative embodiments, the planar lead-frame body portion 53 may be formed in form of a ring shaped body portion encircling the contact pads 51. This does not pose any limitation on the present disclosure and the planar lead-frame body portion 53 may represent only a ring segment and not a complete ring or any other suitable shape which may be obtained when deforming a ring or a ring-shaped segment.

Referring to FIG. 5, a lead-frame 50' is schematically illustrated in a perspective view. The Lead-frame 50' represents the lead-frame 50 in an advanced stage during fabrication of a smart card after integrating the lead-frame 50 of FIG. 4a into a card body (not illustrated) of a smart card (not illustrated), e.g., the smart card 30 of FIG. 1, and after performing a detaching operation for electrically separating the adjacent contact pads from each other. For example, the lead-frame 50' may be integrated in addition to the lead-frame 50 in FIGS. 2, 3a, and 3b into a smart card (not illustrated), such as the smart card 30 of FIG. 1.

The lead-frame 50' results from the lead-frame 50 upon detaching adjacent contact pads, such as a contact pad 51' from an adjacent contact pad 51". Accordingly, a planar contact portion 52 of the contact pad 51' may be used for further interconnection among different modules and/or embedded leads. For example, for detaching adjacent contact pads 51' and 51" from each other, the bridging portion 54 in FIGS. 4a and 4b is removed, together with at partially one or more bridging portions 55 extending between adjacent contact pads in the same plane of the contact pads, constituting an inner ring concentric to the planar lead-frame body portion 53.

In some illustrative embodiments, one or more bridging portions 55 may each mechanically contact (i.e., in direct contact) one or more contact pads 41 in form of one or more lead-frame fingers of a finger-shape, such one or more lead-frame fingers extending between the planar lead-frame body portion 53 and the planar contact portion 52 for electrically and mechanically connecting the planar contact portion 52 with the planar lead-frame body portion 53. For example, the one or more lead-frame fingers may be integral with and projecting away from the planar lead frame body portion 53 towards one or more contact pads 51 or portions integral with and projecting away from one or more contact pads 51 towards the planar lead frame body portion 53.

Furthermore, as it is possible that an optionally remaining part of the bridging portion 55' extending from the bridging portion 54 to the planar lead-frame body portion 53 is in mechanical and electrical contact with at least one contact pad, the bridging portion 55' may be partially removed for ensuring that an undesired mechanical and electrical connection between adjacent contact pads 51' and 52' is avoided.

Referring to FIGS. 6a and 6b, cross-sectional views of the lead-frame 50 of FIG. 5 are schematically illustrated. Herein, FIG. 6a shows a cross-section of some illustrative embodiments, this cross-section being oriented along line A-A in FIG. 5, while FIG. 6b shows a cross-section of some illustrative embodiments, this cross-section being oriented along line B-B in FIG. 5. The remnants of the bridging portion 54 in FIGS. 4a and 4b extend out of plane relative to a plane defined by contact pads 51".

Referring to FIG. 6a, a contact pad 51' in accordance with some special illustrative but non-limiting embodiments is shown in a cross-sectional view. The contact pad 51' may have a stepped portion 55.

Referring to FIG. 7, illustrative embodiments of the present disclosure will be described, representing a possible additional feature to the above described embodiments of a lead-frame. The person skilled in the art will understand, upon a complete lecture of the present disclosure, that the following described embodiments may be realized by appropriately modifying any of the above described lead-frames.

Drawing (a) of FIG. 7 schematically shows a contact pad CP1 of a lead-frame (not illustrated) in accordance with some illustrative embodiments of the present disclosure. The contact pad CP1 comprises a planar contact portion 61 and a holding portion 63, which extends away from the planar contact portion 61. In particular, the holding portion 63 and the planar contact portion 61 are arranged within the same plane when considering a plane as being defined by the planar contact portion 61. The holding portion 63 comprises at least one opening 65 formed in a surface of the holding portion. The at least one opening 65, optionally more than one opening, may be an opening which partially extends into the material of the holding portion 63, possibly representing a through hole through the holding portion 63. In particular, the opening 65 may be formed as a through hole completely extending through a thickness of the holding portion. It is also possible to provide a plurality of openings, some of which represent through holes, while others represent blind holes.

In accordance with some alternative embodiments, the contact pad CP1 may not have a holding portion 65. Instead, the holding portion may be realized as a holding portion provided in a part of a bridging portion, preferably a part of a bridging portion mechanically contacting a contact pad, which is not removed upon detaching of contact pads.

In accordance with some alternative embodiments, the holding portion 65 and the contact portion 61 may be interchanged in drawing (a) of FIG. 7, i.e., the portion 61 may comprise at least one opening 65 for implementing the function of a holding portion, whereas portion 65 in drawing (a) may not have any openings formed therein, thus implementing the function of a planar contact portion.

Referring to drawing (b) of FIG. 7, a contact pad CP2 schematically shown in accordance with some other illustrative embodiments of the present disclosure. The contact pad CP2 may comprise a first portion 71, a second portion 73 and a connecting portion 72 connecting the first portion 71 and the second portion 73. At least one of the first and second portions 71 and 73 may represent a planar contact portion of the contact pad CP2. The first and second portions 71 and 73 are located within different planes, such that the connection portions 72 extends between the first and second portions 71 and 73 along a direction which is substantially parallel or angled with an angle different from 90° to a normal direction of at least one of the first portion 71 and the second portion 73. Furthermore, the contact pad CP2 comprises a holding portion 75 with at least one opening 77. The at least one opening 77 may be provided as a through hole or a blind hole. In case of a plurality of openings 77, at least some of the openings may be provided as through holes.

In accordance with some alternative embodiments, the holding portion 75 and one of the first portion 71 and the second portion 73 may be interchanged in drawing (b) of FIG. 7, i.e., the portion one of the first portion 71 and the second portion 73 may comprise at least one opening for implementing the function of a holding portion, whereas portion 75 in drawing (b) may not have any openings formed therein, thus implementing the function of a planar contact portion. Additionally or alternatively, one of the first and second portions 71 and 73 may have at least one opening formed therein.

Referring to drawing (c) of FIG. 7, a contact pad CP3 is schematically illustrated. The contact pad CP3 comprises a first portion 81, a second portion 83 and a holding portion 85. The first portion 81 and the second portion 83 are connected by a connecting portion 82, while the second portion 83 and the holding portion 85 are connected by another connecting portion 84. The first and second portions 81 and 83 may be portions that are arranged within different planes, which are substantially parallel to each other. The second portion 83 and the holding portion 85 are provided within two planes that are substantially parallel to each other. In accordance with some illustrative embodiments of the present disclosure, the first portion 81, the second portion 83 and the holding portion 85 may be located in different planes. Alternatively, the first portion 81 and the holding portion 85 may be located within the same plane. The connecting portions 82 and 84 are oriented to connect respective ones of the first portion 81, the second portion 83 and the holding portion 85 along a normal direction of the second portion 83.

The holding portion 85 comprises at least one opening 87 formed within the holding portion 85. The at least one opening 87 may be provided as a through hole or as a blind hole. In case of a plurality of openings 87, at least some of the openings may be provided as through holes.

Although the embodiments pursuant to drawing (c) of FIG. 7 are described as the holding portion 85 being arranged at the end of the contact pad CP3, this does not pose any limitation to the present disclosure, because the holding portion 85 may be also arranged at the location of the second portion 83. That is the second portion 83 and the holding portion 85 may be interchanged.

At least one of the first portion 81 and the second portion 83 may be used as a planar contact portion of the contact pad CP3.

Referring to FIG. 8, a contact pad CP4 in accordance with some other illustrative embodiments is shown in a side-sectional view. The contact pad CP4 may comprise a first portion 91, a second portion 93 and a connecting portion 92 connecting the first portion 91 and the second portion 93. At least one of the first and second portions 91 and 93 may represent a planar contact portion of the contact pad CP4. The first and second portions 91 and 93 are located within different planes such that the connection portions 92 extends between the first and second portions 91 and 93 along a direction which is substantially parallel or angled with an angle different from 90° to a normal direction of at least one of the first portion 91 and the second portion 93. Furthermore, the contact pad CP4 comprises a holding portion 95 with an opening 97. The opening 97 may be provided as a through hole.

In accordance with some alternative embodiments, the holding portion 95 and one of the first portion 91 and the second portion 93 may be interchanged in FIG. 8, i.e., the portion one of the first portion 91 and the second portion 93 may comprise an opening for implementing the function of a holding portion, whereas portion 95 in FIG. 8 may not have any openings formed therein, thus implementing the function of a planar contact portion. Additionally or alternatively, one of the first and second portions 91 and 93 may have at least one opening formed therein.

As shown in FIG. 8, the opening 97 may have one or more claws 98 projecting into the opening 97, the one or more claws 98 being formed by at least one projecting portion, which projects into the opening 97 and is tilted relative to a plane defined by the holding portion 95. Alternatively and contrary to the explicit illustration in FIG. 8, the one or more claws 98 may be coplanar with the holding portion 95 in the opening 97. The one or more claws 98 may provide an improved clawing of the holding portion 95 in a body of a prelam body or a card body.

Referring to FIG. 9, another illustrative embodiments of a contact portion are shown. According to the illustration in FIG. 9, a contact pad CP5 in accordance with some other illustrative embodiments is shown in a schematic perspective view. The contact pad CP5 may be similar to the contact portion CP4. For example, it may comprise a first portion 101, a second portion 103 and a connecting portion 102 connecting the first portion 101 and the second portion 103. At least one of the first and second portions 101 and 103 may represent a planar contact portion of the contact pad CP4. The first and second portions 101 and 103 are located within different planes such that the connection portions 102 extends between the first and second portions 101 and 103 along a direction which is substantially parallel or angled with an angle different from 90° to a normal direction of at least one of the first portion 101 and the second portion 103. Furthermore, the contact pad CP4 comprises a holding portion 105 with plural openings 107 and 109. The openings 107 and 109 may be provided as through holes. The person skilled in the art will appreciate that the number of openings may vary from the explicitly shown two openings 107 and 109. Accordingly, three or more openings may be provided in the holding portion 105.

In accordance with some alternative embodiments, the holding portion 105 and one of the first portion 101 and the second portion 103 may be interchanged in FIG. 9, i.e., the portion one of the first portion 101 and the second portion 103 may comprise an opening for implementing the function of a holding portion, whereas portion 105 in FIG. 9 may not have any openings formed therein, thus implementing the function of a planar contact portion. Additionally or alternatively, one of the first and second portions 101 and 103 may have at least one opening formed therein.

As shown in FIG. 9, the each of the openings 107 and 109 may have one or more claws given by projecting portions, each projecting portion projecting into the respective one of the openings 107 and 109. Each projecting portion may be tilted relative to a plane defined by the holding portion 105 or may be coplanar with the holding portion. The openings 107 and 109 may provide an improved clawing of the holding portion 105 in a body of a prelam body or a card body.

The function of the holding portions 63, 75, 85, 95, 105 is to improve a mounting of a lead-frame to a card body. Herein, the holding portions provide an improved connection between the lead-frame and the card body in that material of the card body fills the openings of the holding portions, thereby providing an improved gripping of the contact pad in the card body. It is preferred that the holding portion of a contact pad is arranged towards a center line of a card body such that a maximum amount of material of the card body is located over and below the holding portion. In this way, indentions in card body surfaces deteriorating an aesthetic appearance of a card body, can be avoided. The person skilled in the art will appreciate that an increase in the number of openings and a size of opening in the holding portion will increase a gripping function of the holding portion in the card body.

In some illustrative examples of at least some of the above described embodiments, the at least one lead-frame may be close to a center of gravity of a card body of a smart card, such as in a region defined by a distance in a length direction and a width dimension of a card body of a smart card given by at most about 70% of a length dimension and/or a width dimension of a card body, preferably at most 60% or at most 50% or at most 40% o at most 30% or at most 20% or at most 10% or at most 5% of the length dimension and/or the width dimension of the card body. Accordingly, the at least one lead-frame may be substantially centrally arranged within the card body where less bending occurs during use of a smart card. Regarding a depth of the at least one lead-frame within the card body, the at least one lead-frame may be arranged close to a center line of the card body, such as in a range of about up to 50% of a thickness of a card body around the center line, preferably up to 40% or up to 30% or up to 20% or up to 10% or up to 5% of the thickness of the card body. Accordingly, the at least one lead-frame may be located close to a bend-neutral line of the card body.

The invention claimed is:

1. A A prelaminated body for a smart card having at least one lead-frame integrated into the prelaminated body, the at least one lead-frame comprising:
   a planar lead-frame body portion;
   at least one contact pad having a planar contact portion; and
   at least one bridging portion of an annular ring shape coupled with the planar lead-frame body portion and extending away from the planar lead-frame body portion towards the at least one contact pad and between the planar contact portion and the planar lead-frame body portion,
   wherein the at least one bridging portion extends out of a plane defined by at least one of the planar lead-frame body portion and the planar contact portion and at least partially in parallel to a substantially normal direction of the planar contact portion,
   wherein the at least one bridging portion of the at least one lead-frame is at least partially removed such that the planar lead-frame body portion of the at least one lead-frame and the planar contact portion of the at least one lead-frame are electrically disconnected.

2. The prelaminated body of claim 1, wherein the planar lead-frame body portion and the planar contact portion are arranged in parallel at two different height levels relative to each other.

3. The prelaminated body of claim 1, wherein the at least one bridging portion extends beyond the other one of the planar contact portion and the planar lead-frame body portion.

4. The prelaminated body of claim 1, wherein the planar lead-frame body portion at least one of partially encircles the at least one contact pad and has a substantially ring shape.

5. The prelaminated body of claim 1, wherein the lead-frame has a plurality of contact pads, wherein at least a subset of the plurality of contact pads is arranged coplanar with the planar lead-frame body portion.

6. A prelaminated body for a smart card having at least one lead-frame integrated into the prelaminated body, the at least one lead-frame comprising:
   a planar lead-frame body portion;
   at least one contact pad having a planar contact portion; and
   at least one bridging portion of an annular ring shape coupled with the planar lead-frame body portion and extending away from the planar lead-frame body portion towards the at least one contact pad and between the planar contact portion and the planar lead-frame body portion,
   wherein the at least one bridging portion extends out of a plane defined by at least one of the planar lead-frame body portion and the planar contact portion and at least partially in parallel to a substantially normal direction of the planar contact portion,
   wherein the at least one contact pad has a holding portion with at least one opening formed therein.

7. The prelaminated body of claim 6, wherein the at least one opening is formed as a through hole extending through a thickness of the lead-frame finger in the holding portion.

8. The prelaminated body of claim 6, wherein the holding portion and at least one of the planar lead-frame body portion and the planar contact portion are arranged in parallel at two different height levels relative to each other.

9. A prelaminated body for a smart card having at least one lead-frame integrated into the prelaminated body, the at least one lead-frame comprising:
   a planar lead-frame body portion;
   at least one contact pad having a planar contact portion;
   at least one bridging portion of an annular ring shape coupled with the planar lead-frame body portion and extending away from the planar lead-frame body portion towards the at least one contact pad and between the planar contact portion and the planar lead-frame body portion,
   wherein the at least one bridging portion extends out of a plane defined by at least one of the planar lead-frame body portion and the planar contact portion and at least partially in parallel to a substantially normal direction of the planar contact portion; and
   an opening formed within the prelam body so as to at least partially expose the planar contact portion of the at least one lead-frame and at least partially remove the at least one bridging portion of the at least one lead-frame such that the planar lead-frame body portion of the at least one lead-frame and the planar contact portion of the at least one lead-frame are electrically disconnected.

10. The prelaminated body of claim 9, wherein the opening has a depth reaching to a depth level coplanar with thickness level of about 10% to about 90% of the at least one lead-frame within the prelaminated body.

11. A smart card formed from a prelaminated body having at least one lead-frame integrated into the prelaminated body, the at least one lead-frame comprising:
   a planar lead-frame body portion;
   at least one contact pad having a planar contact portion; and
   at least one bridging portion of an annular ring shape coupled with the planar lead-frame body portion and extending away from the planar lead-frame body portion towards the at least one contact pad and between the planar contact portion and the planar lead-frame body portion,
   wherein the at least one bridging portion extends out of a plane defined by at least one of the planar lead-frame body portion and the planar contact portion and at least partially in parallel to a substantially normal direction of the planar contact portion,
   wherein the at least one bridging portion of the at least one lead-frame is at least partially removed such that the planar lead-frame body portion of the at least one lead-frame and the planar contact portion of the at least one lead-frame are electrically disconnected.

12. A card body of a smart card formed from a prelaminated body having at least one lead-frame integrated into the prelaminated body, the at least one lead-frame comprising:
a planar lead-frame body portion;
at least one contact pad having a planar contact portion; and
at least one bridging portion of an annular ring shape coupled with the planar lead-frame body portion and extending away from the planar lead-frame body portion towards the at least one contact pad and between the planar contact portion and the planar lead-frame body portion,
wherein the at least one bridging portion extends out of a plane defined by at least one of the planar lead-frame body portion and the planar contact portion and at least partially in parallel to a substantially normal direction of the planar contact portion,
wherein the at least one bridging portion of the at least one lead-frame is at least partially removed such that the planar lead-frame body portion of the at least one lead-frame and the planar contact portion of the at least one lead-frame are electrically disconnected.

13. A method of forming a smart card, comprising:
providing a lead-frame comprising a planar lead-frame body portion, at least one contact pad having a planar contact portion, and at least one bridging portion coupled with the planar lead-frame body portion and extending away from the planar lead-frame body towards the at least one contact pad and between the planar contact portion and the planar lead-frame portion, wherein the at least one bridging portion extends out of a plane defined by at least one of the planar lead-frame body portion and the planar contact portion and at least partially in parallel to a substantially normal direction of the planar contact portion.;
preparing a prelaminated card body having the lead-frame integrated therein; and
forming a cavity in the prelaminated card body for at least partially exposing at least one contact pad of the lead-frame.

14. The method of claim 13, wherein the planar lead-frame body portion is at least partially removed by the cavity.

15. The method of claim 13, wherein the lead-frame is fabricated by etching or cutting or punching a flat lead-frame element out of a sheet or strip or band of material and optionally a deep-drawing or bending one of the sheet or strip or band of material and the flat lead-frame element.

16. The method of claim 13, wherein the lead-frame is fabricated by one of sintering, molding, micro-welding, casting and 3D printing.

17. The method of claim 13, wherein the method further comprises exposing the laminated card body to a thermal treatment for at least partially filling the cavity.

18. A method of forming a smart card, comprising:
providing a lead-frame comprising a planar lead-frame body portion, at least one contact pad having a planar contact portion, and at least one bridging portion coupled with the planar lead-frame body portion and extending away from the planar lead-frame body towards the at least one contact pad and between the planar contact portion and the planar lead-frame portion, wherein the at least one bridging portion extends out of a plane defined by at least one of the planar lead-frame body portion and the planar contact portion and at least partially in parallel to a substantially normal direction of the planar contact portion.;
preparing a prelaminated card body having the lead-frame integrated therein; and
forming a cavity in the prelaminated card body for at least partially exposing at least one contact pad of the lead-frame, wherein the at least one bridging portion of the at least one lead-frame is at least partially removed such that the planar lead-frame body portion of the at least one lead-frame and the planar contact portion of the at least one lead-frame are electrically disconnected, and wherein the lead-frame is fabricated by etching or cutting or punching a flat lead-frame element out of a sheet or strip or band of material and optionally a deep-drawing or bending one of the sheet or strip or band of material and the flat lead-frame element.

19. The method of claim 18, the method further comprising forming the at least one opening in the holding portion prior to the etching or cutting or punching.

* * * * *